(No Model.)

F. H. RICHARDS.
MICROMETER GAGE.

No. 305,963. Patented Sept. 30, 1884.

Witnesses
John Buckler.
L. H. Osgood.

Frank H. Richards,
Inventor.
By Worth Osgood,
Attorney.

N. PETERS, Photo-Lithographer, Washington, D. C.

UNITED STATES PATENT OFFICE.

FRANK H. RICHARDS, OF TROY, NEW YORK.

MICROMETER-GAGE.

SPECIFICATION forming part of Letters Patent No. 305,963, dated September 30, 1884.

Application filed May 19, 1884. (No model.)

*To all whom it may concern:*

Be it known that I, FRANK H. RICHARDS, of Troy, county of Rensselaer, and State of New York, have invented certain new and useful Improvements in Micrometer-Gages, of which the following is a full, clear, and exact description, reference being had to the accompanying drawings, and to the letters of reference marked thereon.

My invention has relation to that class of implements employed for obtaining accurate measurements, using the micrometer-screw for minute adjustments, and ordinarily known as "micrometer-gages."

The object of my invention is to produce a simple, cheap, and easily-operating instrument of the class named, wherein the longer adjustments may be rapidly and accurately made, which shall be easy of construction, not liable to get out of order, and afford means of applying the principles of the micrometer-caliper to the accurate measurement of greater dimensions than in former constructions.

To accomplish this my improvements involve certain novel and useful peculiarities of construction, relative arrangements or combinations of parts, and principles of operation, all of which will be herein first fully described, and then pointed out in the claims.

Figure 1:
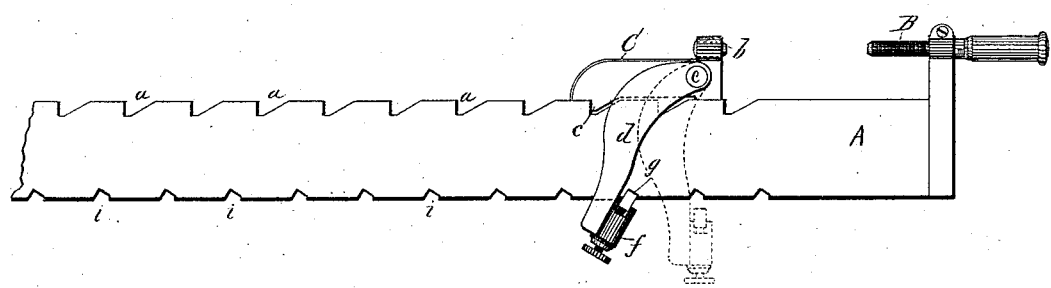
Figure 2:
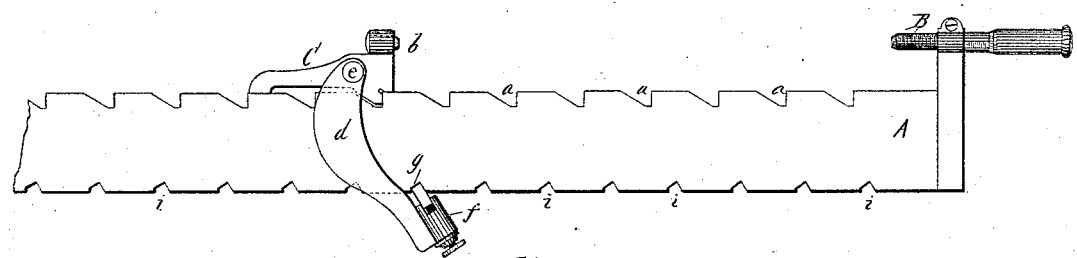
Figure 3:
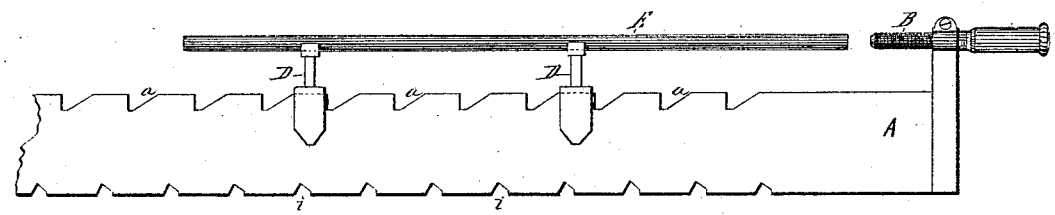
Figure 4:
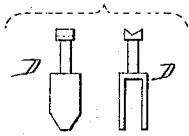
Figure 5:
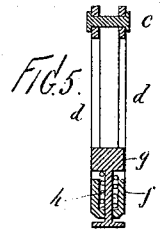

In the drawings, Figure 1 is a side elevation showing the construction and arrangement of my improved implement. Fig. 2 is a similar view showing the notches in the bar arranged so that their plain bearing-faces are reversed from the position indicated in Fig. 1. Fig. 3 is a side elevation showing a rod to be measured supported upon the bar of the implement. Fig. 4 represents a side and edge view of one of the supports detached from the bar. Fig. 5 is a sectional elevation showing the side plates which are hinged upon the movable block, the hinge-pin, and the spring-bolt and socket.

In all these figures like letters of reference, wherever they occur, indicate corresponding parts.

A is the main bar of the implement, made, preferably, of metal, and of any length desired, which length will determine the capacity of the instrument.

At one end of bar A is mounted a micrometer-screw, B, the construction and operation of which is well understood. Along the upper edge of bar A are cut or otherwise formed a series of equidistant notches, $a\ a\ a$, the distances between the vertical or bearing faces of these notches being each equal to the traveling and measuring capacity of the micrometer-screw, usually one inch. The bearing-faces of these notches should be accurately formed and located, for upon their accuracy will depend the correctness of the measurements obtained. The block C is movable upon the upper edge of bar A, and it carries the adjustable screw $b$, corresponding in size and height with the micrometer-screw B. The measurements are made of the distance between the points or ends of the two screws.

On the lower edge of block C, and forming a part of it, is the projecting lug $c$, calculated to enter the notches $a\ a$, and having its vertical face arranged to bear upon the vertical faces of the notches. Upon block C is also the swinging arm hinged, as upon the hinge-pin $e$, and composed of two side plates, $d\ d$, which terminate in or on the socket $f$.

Within socket $f$ is a bolt, $g$, operated upon by a spring, $h$, said bolt being arranged to engage with any one of the series of notches $i\ i\ i$ on the lower edge of bar A. When properly located, the spring-actuated bolt serves to draw and hold block C securely to bar A, and also from the angle at which it acts it serves to draw the block endwise and hold the lug $c$ in intimate contact with the vertical face of notch $a$.

The plates forming the arm are arranged or shaped as plainly shown, and mounted so that the surfaces of contact between block C and bar A are not covered by the plates, and the presence of any foreign substance which would impair the accuracy of measurement can therefore be readily detected.

Between the lug $c$ and the opposite end of the block the block is cut away, as indicated, so that, practically, it only bears upon the bar at its extremities. The block C, being of about the same thickness as the bar, the two plates $d\ d$ serve to keep the block always in proper lateral position.

When it is desired to shift block C from one notch to another, the spring-bolt is drawn back and the arm allowed to swing to a vertical position, when the block may be freely lifted and adjusted to any desired notch, after which the spring-bolt is made to engage with its corresponding notch.

In Fig. 1 the notches are so arranged that the arm, when in place, is inclined in one direction, and in Fig. 2 it is inclined in the opposite direction. Either arrangement may be adopted, care being taken to make the spring which operates upon the spring-bolt of ample strength to prevent any accidental movement of the block. Under either of these forms the bar may be made of any length desired or required.

D D are standards arranged to support a rod or other object, as E, to be measured. These are made removable from the bar A, and are intended to be placed thereon, when required, in the manner plainly indicated between the notches. These standards are forked at bottom, so as to straddle bar A, arranged to fit thereon at any point, and to support the object at convenient height, so that its length or other dimension may be accurately gaged.

Being constructed and arranged substantially in accordance with the foregoing explanations, the improved device is found in practice to admirably answer the purpose or object of the invention, as previously set forth.

Having now fully described my invention, what I claim as new, and desire to secure by Letters Patent, is—

1. The herein-described bar, carrying the micrometer-screw, and having the open equidistant notches upon the upper and lower edges, the upper notches being provided with plain vertical bearing-faces, substantially as and for the purposes set forth.

2. In a micrometer-gage, the combination of a bar having a micrometer-screw affixed thereon, with the movable block provided with the lug or projection, the hinged arm mounted thereon, and the spring-bolt connected with the hinged arm, the parts being arranged substantially as shown and described.

3. The combination, with the bar carrying the micrometer-screw in fixed bearings thereon, said bar being notched on both edges, as explained, of the movable block carrying the hinged arm and the spring-bolt, and arranged to be set and released substantially as shown and described.

4. In a micrometer-gage, the movable block carrying the hinged arm and a spring-bolt connected therewith, said block being cut away between its extremities, and arranged for operation substantially as shown and described.

5. In combination with the notched bar carrying the micrometer-screw and an adjustable block, the removable standards, constructed and arranged for operation substantially as shown and described.

In testimony that I claim the foregoing I have hereunto set my hand in the presence of two witnesses.

FRANK H. RICHARDS.

Witnesses:
W. H. HASSINGER,
G. M. ELDRIDGE.